United States Patent [19]

Brennan et al.

[11] Patent Number: 4,745,418

[45] Date of Patent: May 17, 1988

[54] REUSABLE DEVELOPING POWDER COMPOSITION

[75] Inventors: Thomas J. Brennan; Nancy N. Quan, both of Saint Paul, Minn.

[73] Assignee: Minnesota Mining and Manufacturing Company, Saint Paul, Minn.

[21] Appl. No.: 858,368

[22] Filed: Apr. 30, 1986

[51] Int. Cl.[4] .............................................. G01D 15/00

[52] U.S. Cl. ................................. 346/74.5; 346/160.1

[58] Field of Search ................. 346/74.5, 153.1, 160.1; 355/3 DD, 14 D; 400/119; 101/DIG. 5; 358/301

[56] References Cited

U.S. PATENT DOCUMENTS

| | | | |
|---|---|---|---|
| 3,639,245 | 2/1972 | Nelson | 252/62.1 |
| 3,925,219 | 12/1975 | Strong | 252/62.1 |
| 3,965,022 | 6/1976 | Strong | 252/62.1 |
| 4,402,000 | 8/1983 | Fabel et al. | 346/155 |
| 4,460,907 | 7/1984 | Nelson | 346/153.1 |

*Primary Examiner*—Arthur G. Evans
*Attorney, Agent, or Firm*—Donald M. Sell; James A. Smith; James V. Lilly

[57] ABSTRACT

A non-fusible, monocomponent toner is described which comprises an organic resin having a high fusion point, a magnetically responsive material admixed therewith, and an electrically conductive surface. The toner is capable of being repeatedly used.

18 Claims, 4 Drawing Sheets

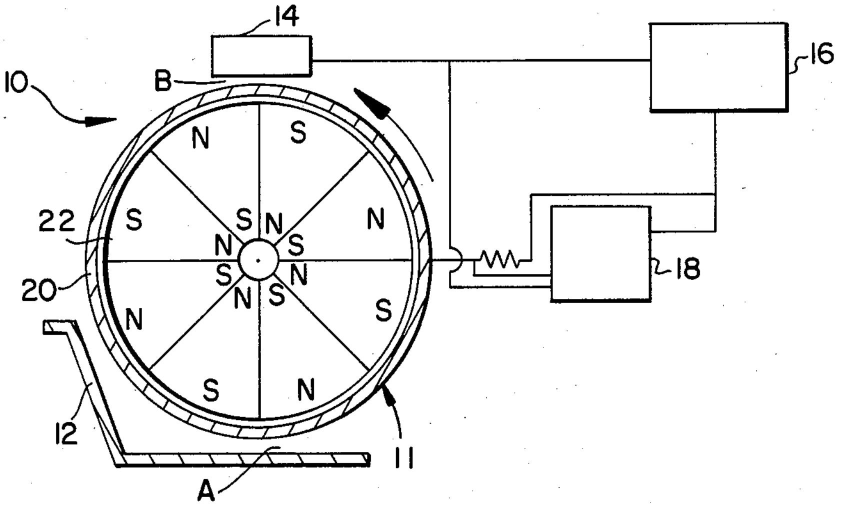
FIG. 1
FIG. 2
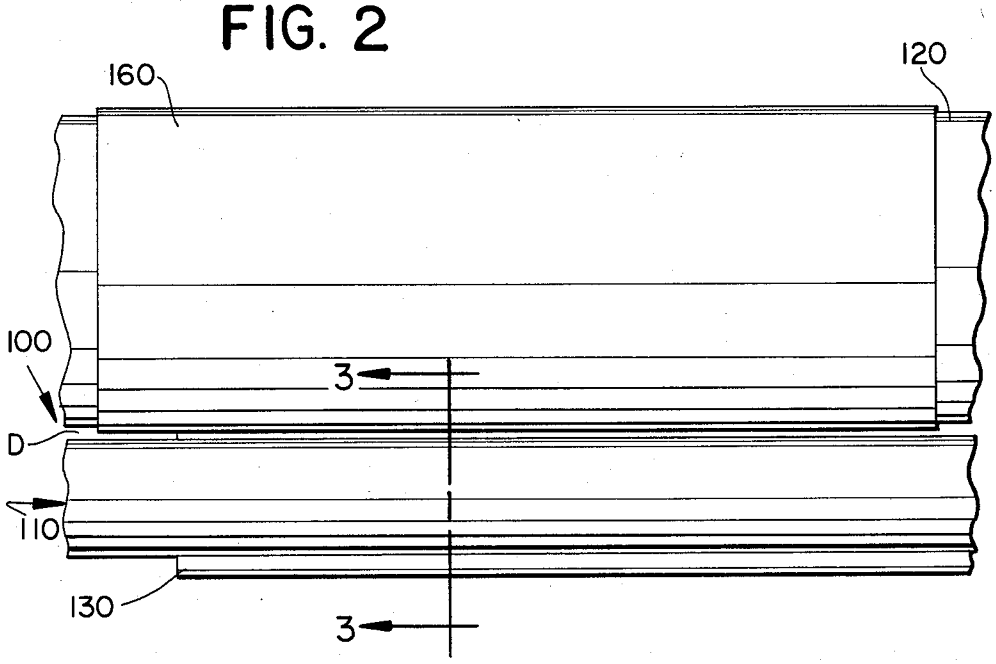

REUSABLE DEVELOPING POWDER COMPOSITION

DESCRIPTION

1. Field of the Invention

This invention relates to developing powders (sometimes referred to herein as toner powders) useful in electrographic recording apparati and to the methods of making and using such powders. More particularly, it relates to developing powders that can be repeatedly used in electrographic stylus recording apparati without fusing to provide unfixed or non-permanent images on a receptor.

2. Description of the Prior Art

Electrographic magnetic stylus recording apparatuses which produce an unfixed or nonpermanent toner powder image on a receptor belt are known. A stylus array is positioned adjacent to the receptor belt to provide a stylus or recording gap. Conductive toner powder is applied to the receptor belt by a magnetic roll (the gap between the magnetic roll and the belt being referred to herein as the doctor gap) and subsequently provided to the recording gap as the receptor belt is moved. A toner powder image is formed in accordance with electrical signals selectively applied to the styli of the array. Toner in non-image areas is removed from the receptor belt by passing it past a second magnetic roll. The gap between this second magnetic roll and the belt is referred to herein as the developer gap.

Since the toner powder image that is formed is unfixed or nonpermanent, the apparati provide for reuse of the toner powder. Toner powder that is not held on the receptor belt as a part of the toner image by an electrical charge and toner that is removed after need for the image has ceased is collected and returned to the portion of the apparatus where toner is supplied to the receptor belt for movement to the recording gap. Apparati of these types are described in U.S. Pat. No. 4,402,000 issued Aug. 30, 1983, U.S. Pat. No. 4,460,907 issued July 17, 1984 and in copending application Ser. Nos. 829,394 (filed Feb. 13, 1986), 837,414 (filed Mar. 7, 1986 and 837,415 filed March 7, 1986.

Because the toner is continually recycled in these apparati, it is repeatedly subject to forces which have a deleterious effect upon it. For example, the continual tumbling action subjects the toner powder to a high level of abrasion which wears away portions of the toner particles and adversely affects the electrical and dimensional properties of the toner. Furthermore, the styli rely on the use of electrical current to generate the signals necessary to form the electrographic images. This current generates heat at and around the styli which softens or fuses the toner and causes it to adhere to the styli. Repeated cycling of the toner exacerbates this problem and further shortens the length of time the styli can be used before they must be cleaned.

Many electrically conductive developing powder compositions and methods for their preparation have been suggested for use in processes of this type. See for example U.S. Pat. No. 4,402,000 at col. 9, lines 18–35 which states that the toners described in U.S. Pat. Nos. 3,639,245; 3,925,219; and 3,965,022 are useful. However, these patents describe heat-fusible toners (the '245 patent) and pressure-fixable toners (the '219 and '022 patents). Although they employ a conductive material (such as carbon black) in a binder material, they are all fusible at relatively low temperatures (i.e., less than 100° C.) and, therefore, are unsuited for extended use in the processes of '907 type since they lack the non-fusing capabilities. Further, they lack the durability necessary to be truly useful in such processes.

DISCLOSURE OF THE INVENTION

The present invention overcomes the disadvantages of the prior art and provides a monocomponent toner which is reusable, durable and non-fusible at temperatures below 120° C. when fusibility is measured according to ASTM F 706-81.

The toner comprises an organic resin having a high fusion point, a magnetically attractable or responsive component (which renders the toner as a whole magnetically responsive) and an electrically conductive, non-magnetically responsive (or non-magnetizable) material. The organic resin and the magnetizable material are admixed together throughout the toner particles while the electrically conductive material is provided as a layer secured to the surface (preferably essentially permanently) of the toner particles.

Other ingredients can be incorporated into the toner of the invention. For example, from about 0.05 to 2% (preferably 0.1 to 0.5%) by weight of the toner of a fatty acid amide containing at least about 10 (preferably between about 18 and 22) carbon atoms may be utilized together with the electrically conductive material on the surface of the toner particles.

Additionally, a minor amount of a wax component having a melting point of at least 60° C. (as determined by ASTM E 324-79) may be incorporated into the toner particles along with the organic resin and the magnetizable material.

As used in describing this invention, the following terms have the following meanings:

"Monocomponent toner" means a toner in which all of the toner particles are functionally capable of being imaged. Additionally, the term monocomponent differentiates the toner from multiple-component carrier/-toner mixtures.

"Reusable" means that the toner can be repeatedly subjected to image development/toner removal cycling without fusing.

"Durable" means that the toner can be repeatedly cycled without a serious loss of conductivity.

"Fusible" means the act of softening or melting when exposed to elevated temperatures.

Tests for determining the SN and free carbon value are described hereinafter.

BRIEF DESCRIPTION OF THE DRAWINGS

FIG. 1 is a schematic view partially in section of an apparatus to measure the conductivity of the toner.

FIG. 2 is a top view of a portion of an apparatus used to measure the free carbon value.

DETAILED DESCRIPTION

Figure 3:
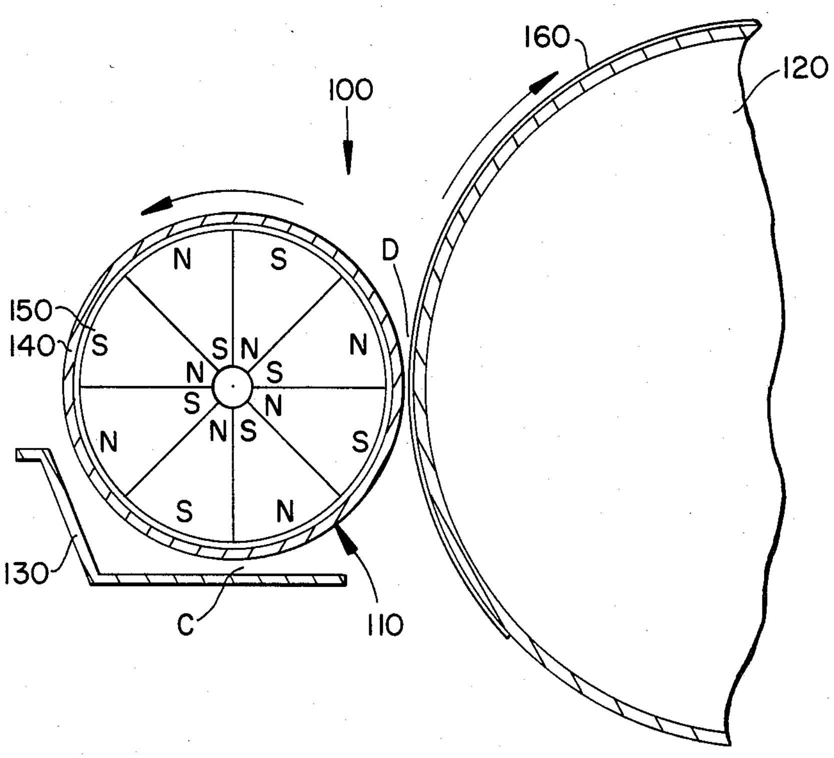
FIG. 3 is a section view along the lines 3—3 of FIG. 2 of said apparatus.

The toner of the invention typically contains from 25 to 60 parts by weight of the high fusion point organic resin (preferably from 35 to 45 parts by weight), from 30 to 75 parts by weight of the magnetically responsive material (preferably from 55 to 65 parts by weight), and from 5 to 10 micrograms/cm$^2$ of surface area of said developing powder of said electrically conductive, non-magnetizable powder (preferably from 6 to 8 micrograms/cm$^2$).

The toner is highly conductive. Conductivity may be measured by its secant number (SN) which is calculated from the formula $$SN\ (\text{megohm}) = \frac{V_{150}}{150\ \text{micro amperes}\ (\mu a)} \qquad \text{(Formula I)}$$

where $V_{150}$ is the voltage at which current flowing through the toner is 150 $\mu$a. The lower the SN value, the higher the conductivity of the toner. The toners of the invention have a maximum 23 hour SN of 0.5 megohm. Preferably, the 23 hour SN is 0.2 megohm or less, most preferably 0.1 megohm or less.

At a SN value of 0.5 megohm, the image density and sharpness are acceptable but not optimal. As the SN value decreases, both image density and sharpness increase dramatically so that at a SN of 0.2 megohm or less the density and sharpness are excellent.

The toner of the invention also possesses an outstanding ability to retain the electrically conductive powder on the toner particles after being continuously cycled for 23 hours. This ability is reported in terms of its free carbon value. Low free carbon values indicate high retention of the carbon on the toner. High free carbon values indicate the presence of free carbon on the test sheet in non-image areas and, correspondingly, a low retention of the carbon on the toner. The toners of the invention have a 23 hour free carbon value of no more than 20. Preferably the 23 hour free carbon value is 10 or less, most preferably 6 or less.

At a free carbon value of 20, the backgrounding is acceptable but noticeable. As the free carbon value decreases, the backgrounding decreases rapidly so that at a value of 10 it is almost undetectable to the naked eye.

The toner preferably has a number average maximum dimension below about 20 microns. More preferably it is between about 5-15 microns in size. The average particle size range of the developing powder is such that at least about 95 number percent of the particles have a diameter greater than about 2 microns while no more than about 5 number percent have a diameter greater than about 30 microns. This range of particle sizes provides excellent image sharpness. Further, it has been found that larger particle size toners cause the apparati in which they are used to require frequent adjustment in order to maintain satisfactory image sharpness. Such frequent adjustments are unnecessary when the toners are in the desired particle size range.

Figure 4:
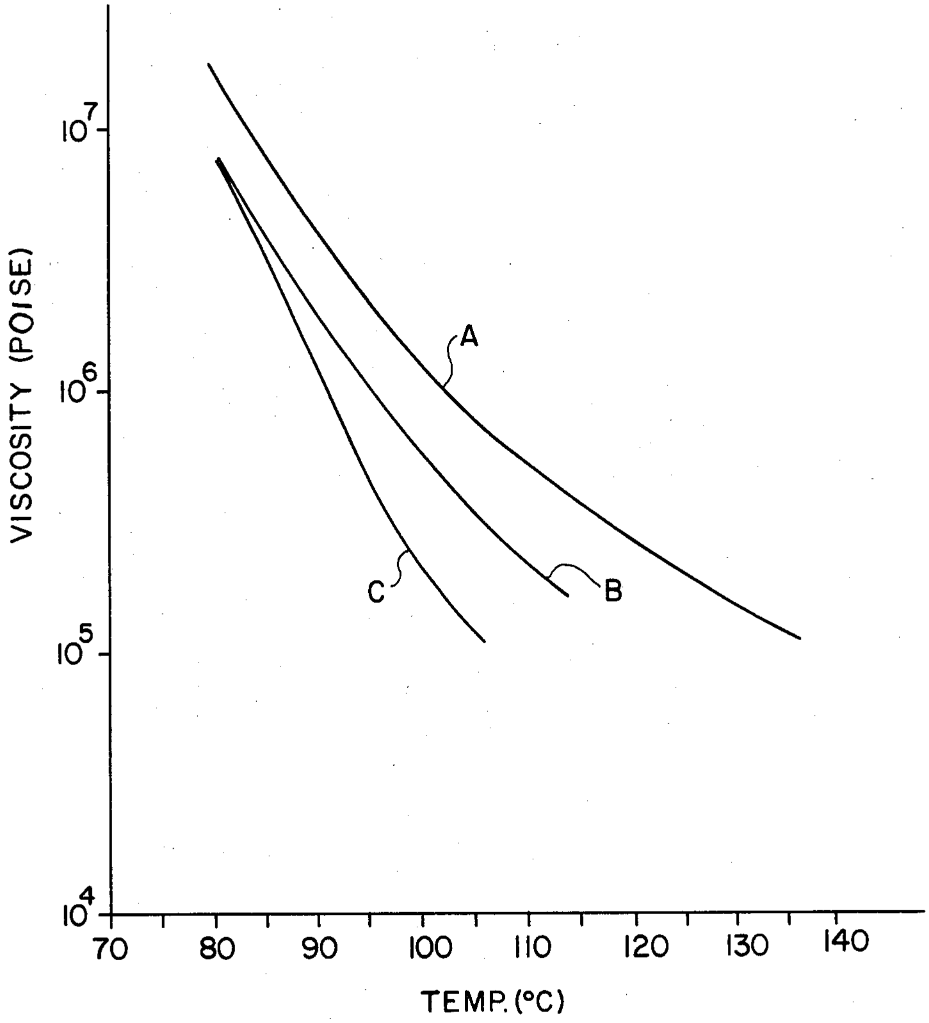
FIG. 4 shows the viscosity response of high fusion point organic resins to temperature under a constant shear.

The high fusion point organic resin used in the toner has a fusion point of at least 100° C. (preferably of at least 120° C.) as measured using ASTM F 706-81 and a glass transition temperature ($T_g$) of at least 55° C. Additionally, useful organic resins preferably exhibit a viscosity versus temperature curve under shear at least that of curve B in FIG. 4, and preferably above that of curve B (e.g., such as that of curve A). Curve C represents the viscosity response of an unacceptable organic resin. These curves are generated by subjecting a 2 millimeter thick test sample to a 10% strain at a rate of 10 radians/sec. in a Rheometric mechanical spectrometer.

Within these guidelines, a number of classes of resins are useful in the invention including, by way of example, polyamides, polystyrenes, epoxy resins, acrylic resins, acrylic copolymers such as styrene/n-butylmethacrylate copolymers, vinyl resins, ethylene vinyl acetate copolymers; cellulose esters such as cellulose acetate butyrate and cellulose ethers. These resins may be used either individually or in combination with each other in the binder.

The magnetically responsive particles used in the toners preferably are finely divided powders (i.e., maximum particle size of 1 micron). Examples of useful materials include magnetite, barium ferrite, nickel zinc ferrite, chromium oxide, nickel oxide, etc. A wide variety of other magnetically responsive materials are known and may be used in place of or in addition to those described above. Generally speaking the magnetically responsive material is electrically conductive and, frequently is considered to be a pigment.

The electrically conductive, non-magnetically responsive material aids in rendering the toner visible and preferably comprises a dry powder material. Most commonly, it comprises a pigment, such as carbon black. Examples of useful electrically conductive, carbon black materials include "Vulcan" XC-72 R and "Black Pearl" 2000 (both available from Cabot Corporation), "Conductex" 950 and 975 (Available from City Service Company), and "Thermax" MT (available from R. T. Vanderbilt).

It has been found that the conductivity of carbon black materials can vary widely. Thus, when selecting a carbon for use in the invention care should taken to insure that only a conductive carbon black is employed. Generally speaking, the conductivity of the carbon black increases as its purity increases. Thus, it is most preferred that carbon blacks having low volatile contents (i.e., less than 2%) be used.

Other materials may be employed in place of carbon black if desired so as to give the toner a color other than black. For example, complexes of copper (such as dimethyl dithio oxyamide (which imparts a blue color) may be employed. Such materials may be used by themselves or in combination with other pigments (such as copper sulfate).

Fluorinated carbon may also be employed as the electrically conductive powder. Such materials are known as shown by "Cermatic", 4 (301) 1969; Denki Kagaku, 51, 756-761, 1963; and Denki Kagaku, 35, 19-23, 1967. Such materials comprise carbon chemically bonded to fluorine. At higher levels of fluorination (e.g., above about 60% fluorine) the carbon becomes gray to light gray in color and can be blended with other colored materials (i.e., dyes and pigments) to provide differently colored toners.

As noted above, fatty acid amides may be used in the present invention. Useful fatty acid amides are solid materials that have melting points of 85° C. or more as determined by ASTM E 324-79 and are only slightly soluble in common solvents. They have a relatively long hydrocarbon chain, that is, one containing at least ten carbon atoms, which terminates with the amide group. The hydrocarbon chain may be either saturated or unsaturated, although unsaturated chains are preferred. The chain is typically linear.

Representative examples of useful fatty acid amides include erucamide, stearamide, behenamide, and oleamide. These materials are available as "Kemamide" E, S, B, and U respectively from Humko-Sheffield.

Other useful fatty acid amides include N,N'-ethylene-bis(tall oil) amide and N,N'-ethylene-bis-oleamide. These materials are available as "Kemamide" W-10 and W-20 from Humko-Sheffield. The tall oil amide is the amidized by-product from sulfate wood pulp digestion. The by-product comprises mainly resin acids and fatty acids such as linoleic acid, abietic acid, linolenic acid; some oleic acid, with 2,2'-dihydrostigmasterol and lignoceryl alcohol.

Also, as noted above, a minor amount of a wax component may be used in the present invention. This component may comprise up to 2.5 parts by weight of the composition, and preferably from 0.5 to 1.6 parts by weight. Normally the wax component is selected from the group consisting of aliphatic compounds such as waxes (either natural or synthetic), fatty acids, glycerides of fatty acids, hydroxylated fatty acids or amides, and so forth.

Representative examples of useful wax components include 12-hydroxystearic acid, glycerides of 12-hydroxystearic acid, N(2-hydroxyethyl)-12-hydroxystearamide, and the reaction product of stearic acid and ethanolamine. Particularly useful wax components include N(2-hydroxyethyl)-12-hydroxystearamide and glycerides 12-hydroxystearic acid.

When a wax component is used, it is preferred that the combination of the organic resin and the wax have a viscosity versus temperature curve under shear as set out above. Thus, it is preferred that the curve be at least that of curve B of FIG. 4.

The use of the fatty acid amide and the wax component does not render the toner unusable even after prolonged cycling. This is surprising because these materials are considerably lower fusing materials than are the organic resins described above and they are considerably softer. Thus, it would be expected that the wear on the toner caused by cycling during use and the heat generated by both the friction encountered during cycling and the electric current passing through the stylus would cause the amide and/or the wax to fuse and agglomerate (i.e., block together). However, this does not occur. Rather, the toners remain free flowing powders over a wide temperature and humidity range and over repeated cycling even when the amide and the wax are used.

The use of the amide also provides at least one unexpected processing advantage. Thus, the toner powders of the invention require substantially less processing time during the dry blending step than do prior art toners. Moreover, they can be reproducibly prepared at essentially a single processing temperature thereby eliminating processing variables based upon the variability in the high fusion point organic resin employed.

Various other materials may be usefully incorporated in or on the toner powder particles of this invention. Thus, for example, flow agents, dye stuffs, plasticizers, and processing aids may be utilized.

Useful flow agents include, for example, small size $SiO_2$ Such materials may be purchased from the DeGussa Corporation as "Aerosil".

The toners of the invention may be readily prepared. For example, a dry-powdered blend of desired composition is first obtained by, for example, mixing the high fusion point organic resin, the wax component if used, and the magnetically responsive material together. The dry blend is then melt mixed with heat until a homogeneous molten mixture is obtained. The molten mixture is then passed over chilled cooling rolls to cool and solidify the composition. As the composition cools it flakes off of the chilled rolls at which time the flakes are collected, ground (e.g., with a hammer mill) and then classified to obtain the desired particle size (i.e., 1 to 40 microns maximum dimension, preferably 5% or less greater than 15 microns maximum dimension).

The powder, which is irregular in shape, may then form into "prespheres" by first aspirating it into a moving gas stream, preferably air, at a rate of 40 grams per minute thus creating an aerosol, and then directing the aerosol at an angle of 90°±5° through a stream of gas, preferably air, which has been heated to about 450° C. and 600° C. into a cooling chamber where the now substantially spherical particles are allowed to settle by gravity as they cool.

The prespheres are then reclassified to obtain the desired particle size (for example 6–15 microns) and dry blended with the fatty acid amide, if used, for 1 hour at ambient temperature. This mixture is then further dry-blended with the electrically conductive powder and heated, with agitation, at a temperature less than the melting point of the resinous material used in the binder but sufficiently high so that said material will soften and allow the conductive powder to become embedded therein. The powder may then be directed at about 90°±5° through a stream of gas, preferably air, heated to a temperature between about 370°–425° C. at a rate of 40 gm/min. to permit the second pigment to become essentially completely embedded in the binder, but not long enough to completely melt the powder particles. The particles are then collected by, for example, cyclone separation, and are preferably blended with a flow agent, such as finely divided silica. The now completed toner is then screened to remove agglomerates and packaged.

The final powder may be characterized as one which is preferably spherical and which has a peripheral layer of a conductive material embedded therein. This peripheral layer may be embedded in the outer surface of the toner so that substantially all of that surface comprises exposed conductive material. Alternatively, it may be completely embedded in the outer surface of the toner so that only an occasional conductive particle projects from the surface. In either case, the toner has an outer surface region which is rich in the conductive material.

The properties of the toner of the invention are shown by the following tests:

A. Conductivity—Secant Number

The Secant Number is measured on a device 10 of the type shown in FIG. 1. Device 10 comprises magnetic roll 11, a toner hopper 12, an electrode 14, a voltage sweep generator 16, and an oscilloscope 18.

Magnetic roll 11 comprises an aluminum shell 20 around a segmented 8 pole magnet 22. Shell 20 is motor driven and rotates in a counterclockwise direction at a rate of 54 rpm. It is about 4 cm in diameter by 28 cm long.

Toner hopper 12 is provided beneath magnetic roll 11 and along its length. It is moveably joined to device 10 so that the gap A between shell 20 and the hopper 12 can be adjusted to a desired opening. In the conductivity test, gap A is adjusted to provide a 0.0375 cm opening.

Electrode 14 is provided above magnetic roll 11 and is adjustable with respect to device 10 so that a desired gap B may be provided. In this test, gap B is adjusted to provide a 0.007 cm opening.

The conductivity test is performed according to the following procedure. Gaps A and B are adjusted to provide the above-identified openings. The toner hopper is cleaned, if necessary, and twenty grams of toner to be tested is distributed evenly across the toner hopper against the magnetic roll. The roll is started and the voltage generator is turned on. The volts/cm setting on the generator is adjusted until the lowest setting is found which gives a trace from 0 to 150 microamperes ($\mu$a) completely within the grid on the oscilloscope. After the magnetic roll has run 3 minutes$\pm$5 seconds, the voltage at which the current is 150 $\mu$a is determined from the oscilloscope. This voltage is then used to determine the Secant Number from Formula I.

B. Free Carbon Value

The free carbon value is measured on a device such as is shown in FIGS. 2 and 3. For purposes of this test, the electrically conductive material used is carbon black so as to facilitate the testing. The results of this test are reported in terms of light reflectance and are referred to as free carbon values. As previously stated, low values, indicate high light reflectance, a high degree of embedment of the carbon (i.e., permanent embedment) and, correspondingly, a toner powder that has uniform conductivity. High values indicate low light reflectance, a low degree of carbon embedment and, correspondingly, a toner powder that has a non-uniform conductivity.

FIGS. 2 and 3 illustrate a device 100 which comprises a magnetic roll 110, a development roll 120, and a toner hopper 130. A section of paper 160 is provided on the development roll.

Magnetic roll 110 comprises an aluminum shell 140 around a segmented 8 pole magnet 150. Shell 140 rotates in a counterclockwise direction and magnet 150 is stationary. A driving means, which is not shown but which may comprise an electric motor, rotates shell 140.

The diameter of roll 110 is conveniently about 3.8 centimeters (cm). The length of roll 110 is, typically, about 28 cm. It is rotated at a speed of 50 rpm.

Toner hopper 130 is provided beneath magnetic roll 110 and along its length. It is moveably joined to device 100 so that the gap C between shell 140 and the hopper 130 can be adjusted to a desired opening. In the free carbon test gap A is adjusted to provide a 0.033 cm opening.

Development roll 120 comprises a hollow aluminum drum. It is preferably about 10 cm in diameter and 25 cm in length. It is moveable so that the gap D between it and the magnetic roll 110 may be adjusted to a desired opening. In the free carbon test, gap D is adjusted to provide a 0.048 cm opening. The development roll rotates at 25 rpm in a clockwise direction in the embodiment shown. It is driven by a motor which is not shown.

The free carbon test is performed according to the following procedure. Gaps C and D are adjusted to respectively provide 0.033 cm and 0.048 cm openings. A portion (20–30 grams) of toner powder to be tested is placed in the left half of hopper 130. Shell 140 is rotated thereby causing the magnetically attractable toner powder to move over the left half of its surface until it forms a uniform layer on the left half of said surface. A section of zinc oxide coated paper, available from Harris/3M Document Products Incorporated, is applied and taped to the surface of development roll 120 so that there are no wrinkles in the paper. The paper 160 is positioned in such a manner that a border of approximately 4 cm is provided on the left side of the paper to which no toner powder is latter applied. See FIG. 3 for a representation of the position of the paper. The development roll is then rotated in a clockwise direction for a desired number of images at a rate of 25 revolutions per minute. The paper 160 is then removed from the development roll and the brightness of the toner portion side is measured along with the brightness of the untreated margin using a photovolt meter, model 670, available from Triplett Electrical Engineering Company. The difference between the reflectance on the untreated margin and the treated portion of the paper is the free carbon number. The greater this difference (i.e., the higher the free carbon number) the more free carbon present and, consequently, the less complete the embedment.

C. 23 Hour Test

This test demonstrates the durability of the toner of the invention. It has been determined that 23 hours of continuous tumbling in this test corresponds to 75,000 cycles in normal use. In this test an apparatus consisting of the magnetic roll 11 and the toner hopper 12 as shown in FIG. 1 is employed. The gap A is adjusted to 0.0375 cm and 30 grams of toner are placed in the hopper 12. The roll 11 is driven at a rate of 140 rpm for 23 hours. The toner is then tested for image density and backgrounding.

Image density is measured by a Macbeth Quanta-Log Diffuse Reflection Densitometer model RD-514. Backgrounding is measured by a photovolt meter, model 670 available from Triplett Engineering Co. In the case of image density, higher values mean a more dense image. In the case of backgrounding, higher numbers mean less backgrounding.

The present invention is further illustrated by means of the following examples wherein the term "parts" refers to parts by weight unless otherwise indicated.

EXAMPLE 1

(Comparative)

Toner powder preparticles were prepared from the following ingredients:

| | Parts |
|---|---|
| Epoxy Resin (reaction product of epichlorohydrin and bisphenol A, available from Shell Chemical Company as "Epon" 1004, Fusion point 109° C.) | 40 |
| Magnetite | 60 |

The epoxy resin (which had a viscosity response as shown by curve C in FIG. 4) and magnetite were dry blended and then heated to melting with stirring until a homogeneous molten mixture was obtained. The mixture was passed over chilled cooling rolls where the mixture was cooled and solidified. The solidified mixture flaked off of the chilled rolls and the flakes were collected, chilled with dry ice and reduced to fine powder particles using a hammer mill. The resultant particles were classified so that less than 5% had a particle size of greater than 15 microns.

This powder was fed to an air aspirator in a uniform stream at a rate of about 40 grams per minute. The aspirator sucked the particles into the airstream and dispersed them, forming an aerosol. This aerosol was directed at an angle of 90°±5° into an airstream, heated to about 450° C. The powder was then allowed to settle and was collected by filtration. It was then classified to obtain preparticles in the range of 6–15 microns.

The preparticles were dry blended with carbon black (7.5 μg/cm² preparticles, "Vulcan" XC-72R from Cabot Corporation) and $SiO_2$ (0.05 part "Aerosil" R 972) at 60° C. for 12 hours. The resulting powder was tested for various properties both originally and after cycling in a process as described in U.S. Pat. No. 4,402,000 operating at a doctor gap of 0.05 cm and a stylus gap of 0.013 cm and a developer gap of 0.064 cm. The values are reported in Table 1.

TABLE 1

| | Original | Cycled |
|---|---|---|
| Fusion Point (°C.) | 109 | 109 |
| Secant Number (megohm) | 0.125 | 0.5 |
| Resistance to Abrasion (Free Carbon) | 19 | 6 |

After 48,000 cycles the toner had very poor flow characteristics, was resistive, as shown by the high secant number, and did not produce clean images. That is there was substantial ghosting from previously applied images. The toner also produced severe backgrounding (which adversely effected image contrast). The drop in free carbon value and the high secant number show that the carbon black has been removed from the toner during the test. The density of images provided by the toner was also negatively effected. Thus, after cycling the images did not have acceptable image density. Finally, a significant quantity of the toner had fused and adhered to the styli so that the styli had to be removed and cleaned.

EXAMPLE 2

A toner powder according to the invention was prepared using the procedures of Example 1, but substituting "Ionac" X-231 (Styrene/n-Butyl Methacrylate copolymer available from Ionac Chemical Company, fusion point 138.9° C., melt index 18 g/10 min.) for the Epon. The "Ionac" had the viscosity response shown by curve A in FIG. 4. The following toner formulation was made:

| | Parts |
|---|---|
| "Ionac" X-231 | 40 |
| Magnetite | 60 |
| "Vulcan" XC-72R Carbon Black | 8.5 μg/cm² |
| "Aerosil" | 0.05 |

The resultant toner was tested for various properties both originally and after 85,000 cycles in a magnestylus recording process such as described in U.S. Pat. No. 4,402,000 operating at a doctor blade gap of 0.05 cm, a stylus gap of 0.013 cm and a developing gap of 0.064 cm. The results are reported in Table 2.

TABLE 2

| | Original | Cycled |
|---|---|---|
| Fusion Point (°C.) | 138.9 | 138.9 |
| Secant Number (Megohm) | 0.025 | 0.12 |
| Resistance to Abrasion (Free Carbon) | 6 | 10 |

After 85,000 cycles the toner had good flow properties and was only slightly more resistive. Additionally, it gave ghost-free images and no backgrounding. The density of images provided by the toner remained virtually unchanged over the test. At all times the density was acceptable. No adherence of the toner to the stylus was observed during the course of the test.

The low secant number even after extensive cycling shows that high levels of carbon remain secured to the toner. This is further shown by the low free carbon value.

EXAMPLE 3

A toner powder was prepared using the procedures of Example 1, but again substituting "Ionac" X-231 for the "Epon" and further employing Castorwax (a synthetic wax prepared by the essentially complete hydrogenation of castor oil; principal constituent is the glyceride of 12-hydroxystearic acid; contains minor quantities of glycerides of 12-hydroxystearic acid, dihydroxystearic acid and stearic acid, available from N. L. Industries as "CasChem") and "Kemamide" E (erucamide, available from Humko-Sheffield). The mixture of "Ionac" and Castorwax had the viscosity response shown by curve B in FIG. 4.

The Castorwax was added to the formulation along with the "Ionac" and the magnetite during the initial dry blending step. The "Kemamide" was added after classification of the preparticles and blended at room temperature for one hour.

The following toner formulation was made:

| | Parts |
|---|---|
| "Ionac" X-231 | 39.2 |
| Magnetite | 60.0 |
| Castorwax | 0.8 |
| "Vulcan" XC-72R | 7.5 μg/cm² |
| "Aerosil" | 0.05 |
| "Kemamide" E | 0.5 |

The resultant toner was tested for various properties both originally and after continuous cycling for 23 hours. The results are reported in Table 3.

TABLE 3

| | Original | Cycled |
|---|---|---|
| Fusion Point (°C.) | 139 | 139 |
| Secant Number (Megohm) | 0.006 | 0.1 |
| Resistance to Abrasion | 6 | 15 |

The toner was also tested for image density and resistance to backgrounding after various numbers of cycles using a magnestylus recording process such as described in U.S. Pat. No. 4,402,000 operating at a doctor gap of 0.1 cm, a stylus gap of 0.015 cm and a developer gap of 0.12 cm.

Figure 5:
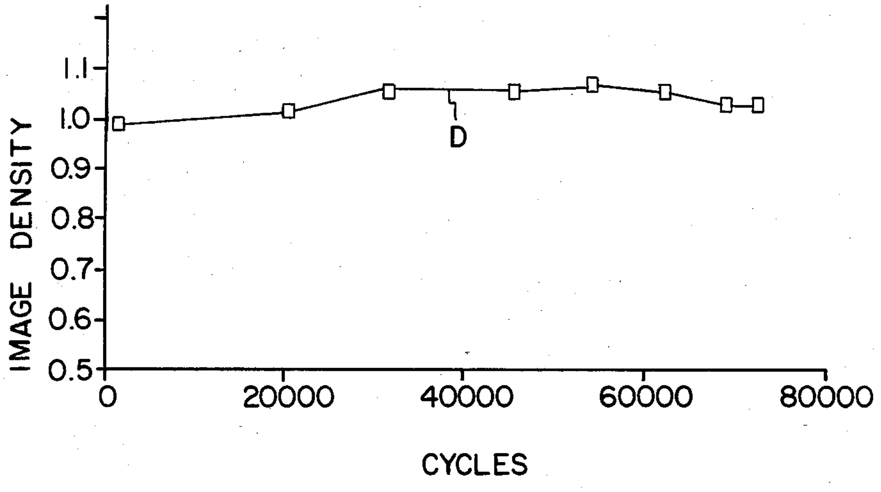
FIG. 5 is a plot showing the optical image density of images developed by the toner of the invention over a number of cycles.
Figure 6:
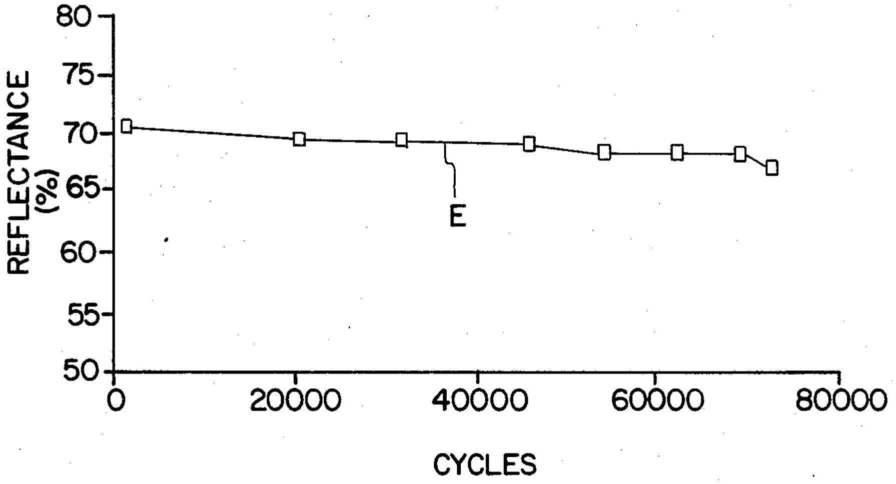
FIG. 6 is a plot showing the reflectance or background characteristics of sheets having images developed by the toner of the invention over a number of cycles.

The results of these tests are shown in FIGS. 5 and 6. As can be seen by reference to FIG. 5, curve D, the image density of images toned according to the invention, remains virtually the same over the life of the test.

Furthermore, FIG. 6, curve E, shows that the tendency of the toner of the invention to cause backgrounding remains virtually unchanged over the life of the test. In both FIGS., 5 and 6, curves D and E are essentially horizontal.

After cycling the toner had good flow properties and was only slightly more resistive. Additionally, it gave ghost-free images and no backgrounding. No adherence of the toner to the stylus was observed.

We claim:

1. A magnetically responsive developing powder of particles comprising an organic resin having a high fusion point and a glass transition temperature of at least 55° C., a magnetically responsive component admixed with said organic resin, and a layer of an electrically conductive, non-magnetizable powder secured to the surface of said particles, said electrically conductive powder having a particle size substantially smaller than that of said developing powder, wherein said developing powder is non-fusible at temperatures below 120° C. and has a maximum 23 hour secant number of 0.5 megohm.

2. A developing powder according to claim 1 further containing a fatty acid amide component containing at least about 10 carbon atoms secured to the surface of said particles.

3. A developing powder according to claim 2 wherein said electrically conductive material and said fatty acid amide are essentially permanently secured to said particles.

4. A developing powder according to claim 2 wherein said fatty acid amide comprises from 0.05 to 2% by weight of said developing powder.

5. A developing powder according to claim 2 wherein said fatty acid amide contains from 18 to 22 carbon atoms.

6. A developing powder according to claim 2 wherein said fatty acid amide is selected from the group consisting of erucamide, stearamide, behenamide, oleamide, N,N'ethylene-bis(tall oil)amide, and N,N'-ethylene-bis-oleamide.

7. A developing powder according to claim 6 wherein said fatty acid amide is erucamide.

8. A developing powder according to claim 2 further comprising a minor amount of a wax component having a melting point of at least 60° C. admixed with said organic resin and said magnetically responsive component.

9. A developing powder according to claim 8 wherein said wax component comprises up to 2.5 percent by weight of said developing powder.

10. A developing powder according to claim 1 comprising from 25 to 60 parts by weight of said organic resin, from 30 to 75 parts by weight of said magnetically responsive component, and from 5 to 10 micrograms/$cm^2$ of surface area of said developing powder of said electrically conductive, non-magnetizable powder.

11. A developing powder according to claim 1 having a maximum 23 hour secant number of less than 0.2 megohm.

12. A developing powder according to claim 1 wherein said electrically conductive, non-magnetizable powder is carbon black.

13. A developing powder according to claim 12 wherein said carbon black has a volatile content of less than 2 percent.

14. A developing powder according to claim 12 wherein said organic resin comprises a copolymer of styrene and n-butyl methacrylate.

15. A magnetically responsive, electrically conductive toner powder comprising particles containing (a) an admixture of a high fusion point organic resin having a glass transition temperature of at least 55° C. and a magnetically responsive component, and (b) a layer of a non-magnetizable electrically conductive powder having a particle size substantially smaller than that of said developing power, and a fatty acid amide component containing at least 10 carbon atoms, said layer being secured to the surface of said particles, wherein said toner powder is capable of being repeatedly used to develop an image formed on a receptor by an electrographic magnetic stylus electrode operating at 120° C. or less without fusing, wherein said toner powder has a maximum 23 hour secant number of 0.5 megohm.

16. A toner powder composition which comprises a plurality of particles capable of repeated reuse at temperature below about 120° C. without fusing, said toner having a maximum 23 hour secant number of 0.5 megohm, said toner comprising particles containing (i) a homogeneous blend of an organic resin which has a glass transition temperature of at least 55° C. and which does not fuse at temperatures below about 120° C., a magnetically responsive material, and a minor amount of a wax component having a melting point of at least 60° C., and (ii) a surface layer of a non-magnetizable, electrically conductive powder and a fatty acid amide component, said surface layer being securely attached to said particles.

17. A method of forming a developing powder comprising the steps of forming a dry blend of an organic resin having a high fusion point and a glass transition temperature of at least 55° C. and a magnetically responsive component, heating said dry blend and mixing until a homogeneous mixture is obtained, forming a solid mixture by cooling said molten mixture to less than the melting point thereof, breaking the solid mixture into small particles, dry blending the small particles at room temperature with a fatty acid amide containing at least 10 carbon atoms so as to loosely secure said fatty acid amide to the surface of said small particles, blending the dry blended small particles with an electrically conductive, non-magnetizable powder at a temperature less than the melting temperature of said organic resin so as to embed said electrically conductive material on the surface of said particles, and directing said blended particles at an angle of 90°±50° through a stream of gas heated to a temperature between about 370° C. and 425° C. for a time sufficient to essentially completely embed said electrically conductive, non-magnetizable powder and said fatty acid amide on the surface of said particles.

18. A non-fusing, monocomponent developing powder comprising an organic resin having a fusion point of at least 120° C., a magnetically responsive material admixed therewith wherein said powder has an electrically conductive surface layer therearound.

* * * * *

UNITED STATES PATENT AND TRADEMARK OFFICE
CERTIFICATE OF CORRECTION

PATENT NO. : 4,745,418

DATED : May 17, 1988

INVENTOR(S) : Thomas J. Brennan and Nancy N. Quan

It is certified that error appears in the above-identified patent and that said Letters Patent is hereby corrected as shown below:

Col. 5, line 65, there should be a period after -- $SiO_2$ --.

Col. 12, line 56, "$50^{o}$" should be -- $5^{o}$ --.

Signed and Sealed this

Fourth Day of July, 1989

Attest:

DONALD J. QUIGG

*Attesting Officer*

*Commissioner of Patents and Trademarks*